3 Sheets. Sheet 1.

C. Wheeler Jr.
Mower.

No. 1970 Reissued May. 23. 1865.

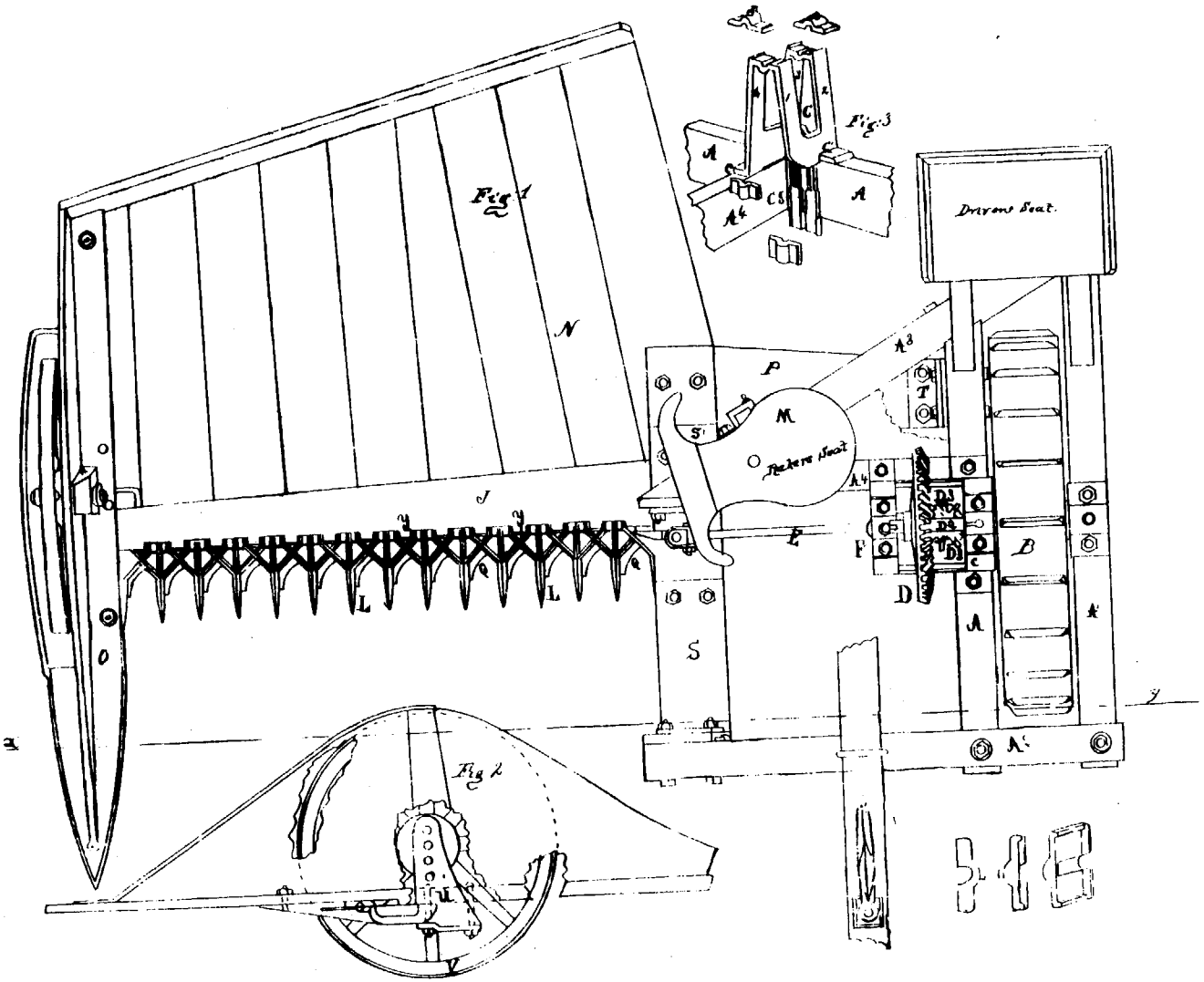

Witnesses James H. Gridley
Allen T. Houghton

C. Wheeler Jr. By
E. B. Forbush Atty.

No. 1,970.—CYRENUS WHEELER, Jr., Poplar Ridge, N. Y., assignee by mesne assignment of E. B. FORBUSH.—*Harvester*.—Patented April 17, 1855; reissued April 26, 1859; again reissued May 23, 1865.

*Claim*.—First, providing and using a strengthening bar in the construction of a removable grain platform, so as to give additional strength and stiffness to the platform, for the purposes and substantially as described.

Second, the combination of a removable grain platform with a short finger bar and a grain frame of a mowing machine, substantially as described, for the purpose of converting a mowing machine into a reaping machine, without change of finger bar or cutters, the combi- 3 Sheets-Sheet 2.
C. Wheeler, Jr.
Mower.
No. 1970 Reissued May 23. 1865.
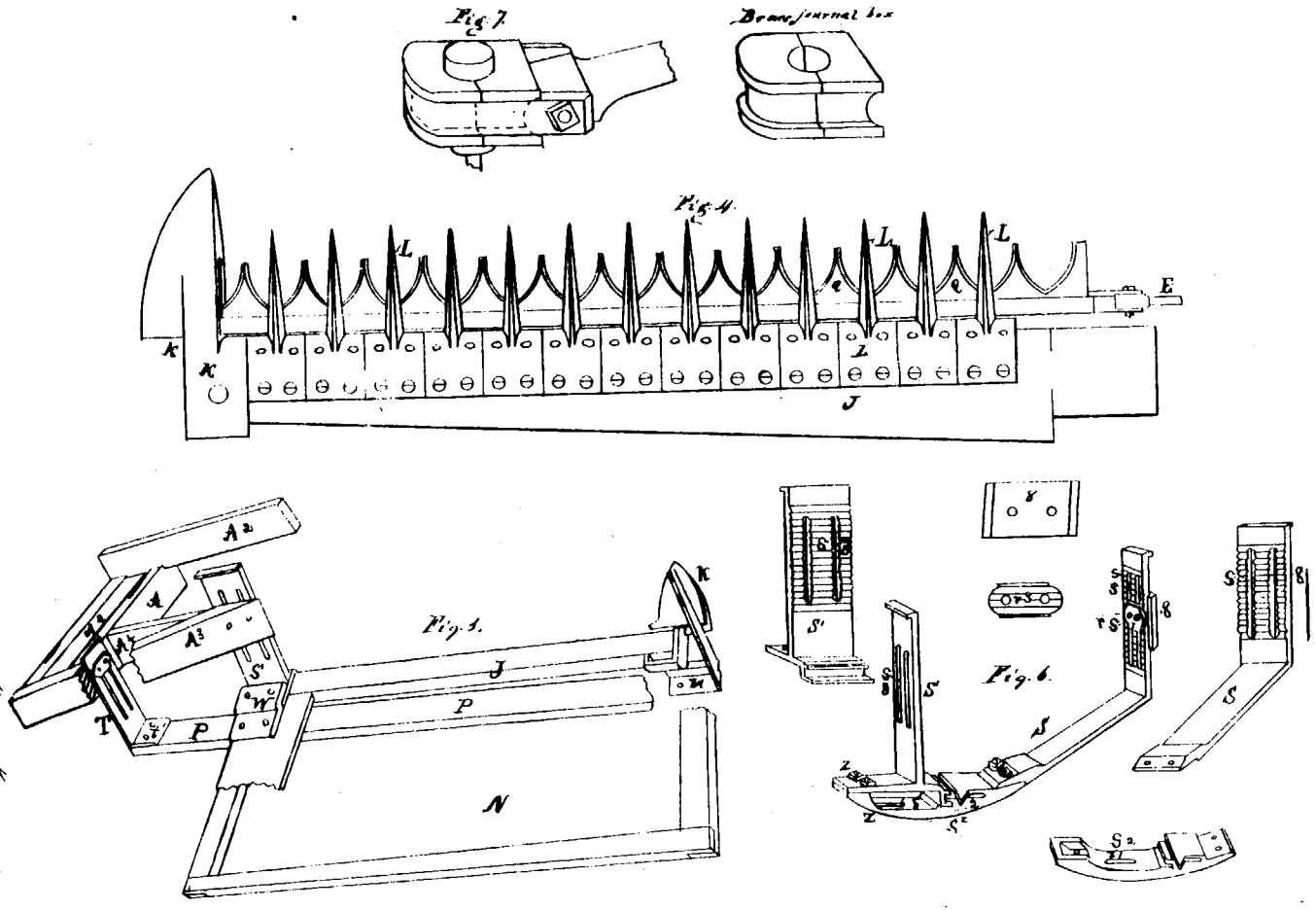
Witnesses
James H. Spiers
William T. Longstreth
C. Wheeler Jr.
By E. B. Forbush
Atty 3 Sheets. Sheet 3.
C. Wheeler Jr.
Mower.
No. 1970
Reissued May. 23. 1865.
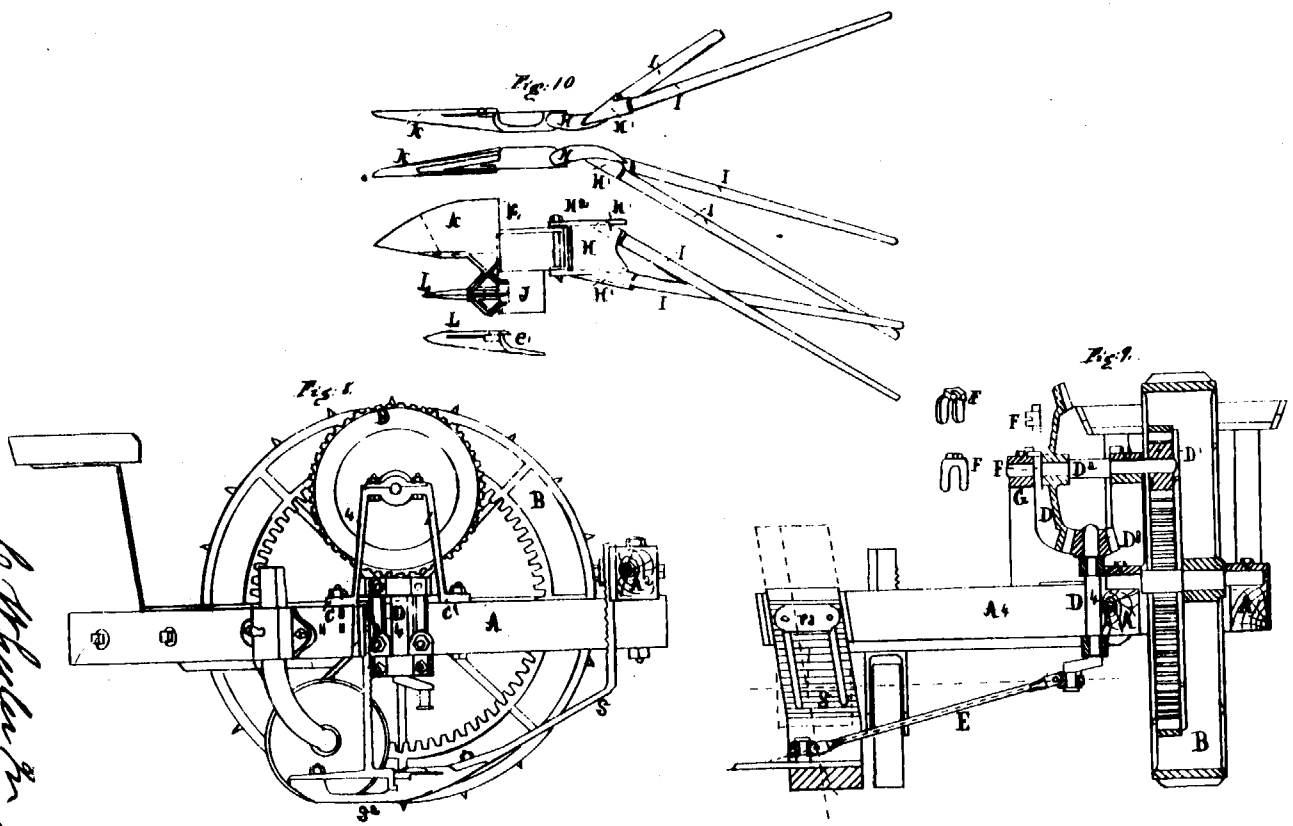
Witnesses
James H. Quigley
Allen F. Jamgotten
C. Wheeler Jr
By P. P. Forbush
Atty

UNITED STATES PATENT OFFICE.

CYRENUS WHEELER, JR., OF POPLAR RIDGE, NEW YORK, ASSIGNEE, BY MESNE ASSIGNMENTS, OF E. B. FORBUSH.

IMPROVEMENT IN HARVESTER.

Specification forming part of Letters Patent No. 12,721, dated April 17, 1855; Reissue No. 707, dated April 26, 1859; Reissue No. 1,970, dated May 23, 1865.

DIVISION D.

*To all whom it may concern:*

Be it known that ELIAKIM B. FORBUSH, of the city of Buffalo, in the county of Erie and State of New York, heretofore invented certain new and useful Improvements in Grain and Grass Harvesting Machines, for which Letters Patent of the United States were duly issued to him on the 17th day of April, 1855, which said Letters Patent were afterward canceled, and new Letters Patent issued on the 26th day of April, 1859; and such last-mentioned Letters Patent being now deemed to be invalid and inoperative by reason of a defective and insufficient specification, now, therefore, I, CYRENUS WHEELER, Jr., of Poplar Ridge, in the county of Cayuga and State of New York, assignee, by mesne assignments, of the whole interest, right, and title of said Letters Patent and of the said invention and improvements, do hereby declare, pursuant to the statutes in such case made and provided, that the following is a full and exact description of a distinct and integral part of said invention and improvements, reference being had to the accompanying drawings, making a part of this specification, in which—

Figure 1 is a top or plan view of said grain and grass harvesting machine. Fig. 2 is an outer end elevation of the grain-platform. Fig. 3 is a perspective view of a cast-iron frame for supporting the small gear-wheels in compact working position. Fig. 4 is a bottom plan of the finger-bar and cutting apparatus. Fig. 5 is a detached perspective to show the strengthening-bar of the grain-platform and the manner of connecting it to the main frame of the machine. Fig. 6 is a perspective of the device called a "clamp" for holding the finger-bar and cutting apparatus and for connecting the same to the main frame of the machine, each part thereof also being shown separately. Fig. 7 is an end view of the connecting-rod and brass journal-box separate therefrom. Fig. 8 is a side elevation of the machine, the grain-platform, the finger-bar, and cutting apparatus being removed. Fig. 9 is a section of the driving-wheel, gear-frame and gearing, and connecting-rod, and a portion of the main frame and clamp, with detached views of the gear-key. Fig. 10 represents different views of the track-clearer.

Letters of like name and kind refer to like parts in each of the figures.

The nature of the said invention and improvements, so far as the same are embraced in the part or division thereof herein described and claimed, consists, first, in providing and using a strengthening-bar, in the construction of a removable grain-platform, so as to give additional strength and stiffness to the platform; second, in the manner of combining a removable grain-platform with the finger-bar and main frame of a mowing-machine, for the purpose of converting a mowing-machine into a reaping-machine without change of finger-bar or cutters, the combination and connection being such that the strength of the grain-platform is united with the strength of the finger-bar to prevent the platform or finger-bar from materially bending or springing when in use in reaping grain.

In Fig. 1 the grain-platform, finger-bar, and cutting apparatus are shown in their combination and relative arrangement with the main frame of the machine, the platform being represented at N, the finger-bar at J, the guard-fingers at L, the cutters at Q, the strengthening-bar of the platform at P, the main frame of the machine at A, A′, $A^2$, $A^3$, and $A^4$, and the clamp for connecting the finger-bar with the main frame at S. The strengthening-bar P is a strong stiff bar, which forms the front timber of the platform-frame, and, when connected with the machine, lies parallel with the finger-bar. This strengthening-bar connects with the two end timbers of the platform, but extends inwardly beyond the covering of the platform, in order to connect with the main frame near the driving-wheel. The connection is formed by means of the slotted hanger T, (which admits of the adjustability of the platform to different heights,) and is more distinctly shown in Fig. 5. The rear cross-timber of the main frame is shown as broken away in Fig. 5, in order to show clearly the connection of the hanger to the parallel timber A of the main frame. This hanger also has a foot-piece, $t'$, by which it is bolted to the strengthening-bar. The outer end of the strengthening-bar is also shown as broken off, in order to show more clearly the cast-iron standard U for supporting the platform-wheel V. The platform is connected to the clamp by means of the plate W, and hence by the clamp to the main frame and finger-bar. The platform is also connected to the outer end of the finger-bar and outer shoe by means of the divider or end timber, O, and the standard U, so that the platform and finger-bar are firmly bound together, and their combined strength and stiffness obtained to prevent the bending or springing thereof in reaping. The finger-bar terminates at the inside shoe, (or at the heel of the cutters,) and is therefore a short finger-bar. By this construction and combination of the grain-platform with the short finger-bar the same finger-bar and cutters which are used for mowing may be also used for reaping, and thereby great economy, utility, and convenience are obtained.

Having now fully described this part of the said invention, so that persons skilled in the art can make and use the same, what I claim as the invention of the said FORBUSH, and desire to secure by these Letters Patent, is—

1. Providing and using a strengthening-bar in the construction of a removable grain-platform, so as to give additional strength and stiffness to the platform, for the purposes and substantially as described.

2. The combination of a removable grain-platform with a short finger-bar and main frame of a mowing-machine, substantially as described, for the purpose of converting a mowing-machine into a reaping-machine without change of finger-bar or cutters, the combination and connection being such that the strength of the grain-platform is united with the strength of the finger-bar to prevent the platform or finger-bar from materially bending or springing when the machine is used for reaping grain, substantially as described.

In testimony whereof I hereunto subscribe my name in the presence of two witnesses.

C. WHEELER, JR.

Witnesses:
W. H. MEAKER,
WM. ALLEN.